No. 12,538. REISSUED OCT. 9, 1906.

C. H. KEENEY.

ELECTRIC CONTROLLER.

APPLICATION FILED MAR. 30, 1904.

2 SHEETS—SHEET 1.

Witnesses.

Alma Kluz.

Anna F. Schmidtbauer

Inventor.

Charles H. Keeney

By Benedict and Morsell.

Attorneys.

No. 12,538. REISSUED OCT. 9, 1906.

C. H. KEENEY.

ELECTRIC CONTROLLER.

APPLICATION FILED MAR. 30, 1904.

2 SHEETS—SHEET 2.

Witnesses:
Alma Klug.
Anna F. Schmidtbauer

Inventor:
Charles H. Keeney.
By Benedict & Morsell.
Attorneys.

UNITED STATES PATENT OFFICE.

CHARLES H. KEENEY, OF MILWAUKEE, WISCONSIN, ASSIGNOR, BY MESNE ASSIGNMENTS, TO EMIL BRAND.

ELECTRIC CONTROLLER.

No. 12,538. Specification of Reissued Letters Patent. Reissued Oct. 9, 1906.

Original No. 687,829, dated December 3, 1901. Application for reissue filed March 30, 1904. Serial No. 200,849.

*To all whom it may concern:*

Be it known that I, CHARLES H. KEENEY, residing at Milwaukee, in the county of Milwaukee and State of Wisconsin, have invented a new and useful Improvement in Electric Controllers, of which the following is a description, reference being had to the accompanying drawings, which are a part of this specification.

The object of my invention is to provide an improved electric-current controller adapted in an electric system to automatically control, reverse, and shut off the electric current.

The invention is directed chiefly to the novel construction and arrangement of the controller, including the electric system in which it is embodied and its various parts, whereby a maximum of efficiency is secured in a combination of devices having a minimum of parts.

The invention consists of the devices, their parts and combinations, as herein described and claimed, or the equivalents thereof.

Figure 1:
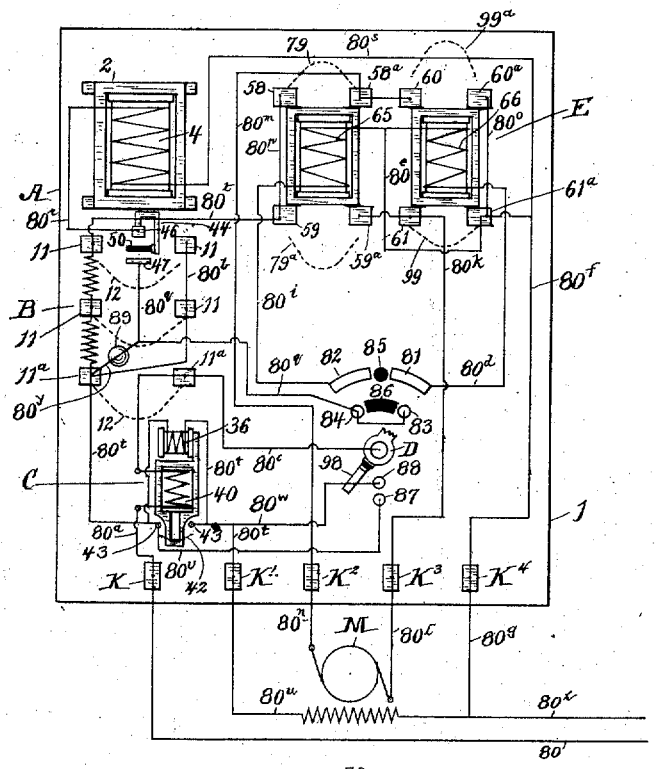
Figure 6:
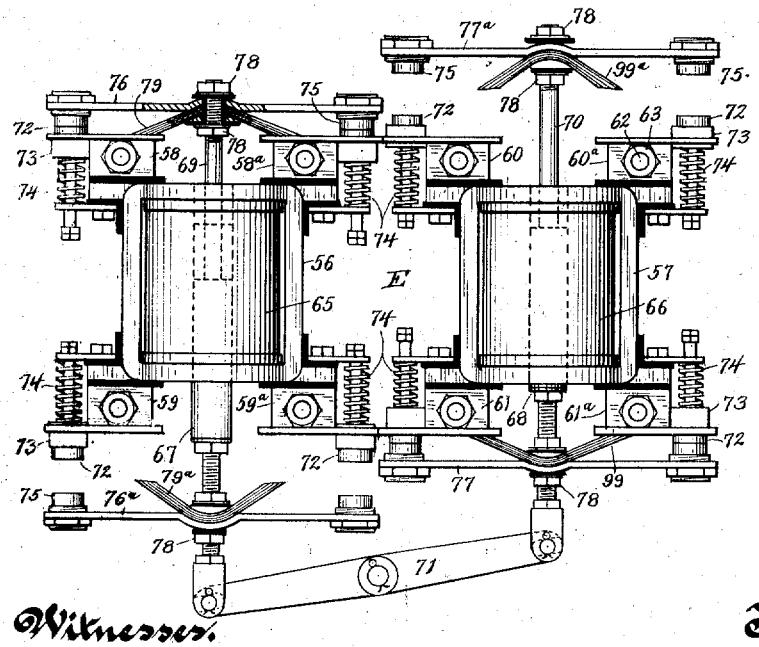
Figure 7:
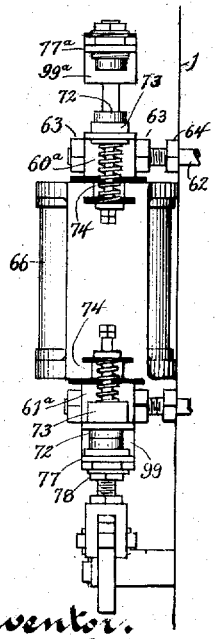
Figure 2:
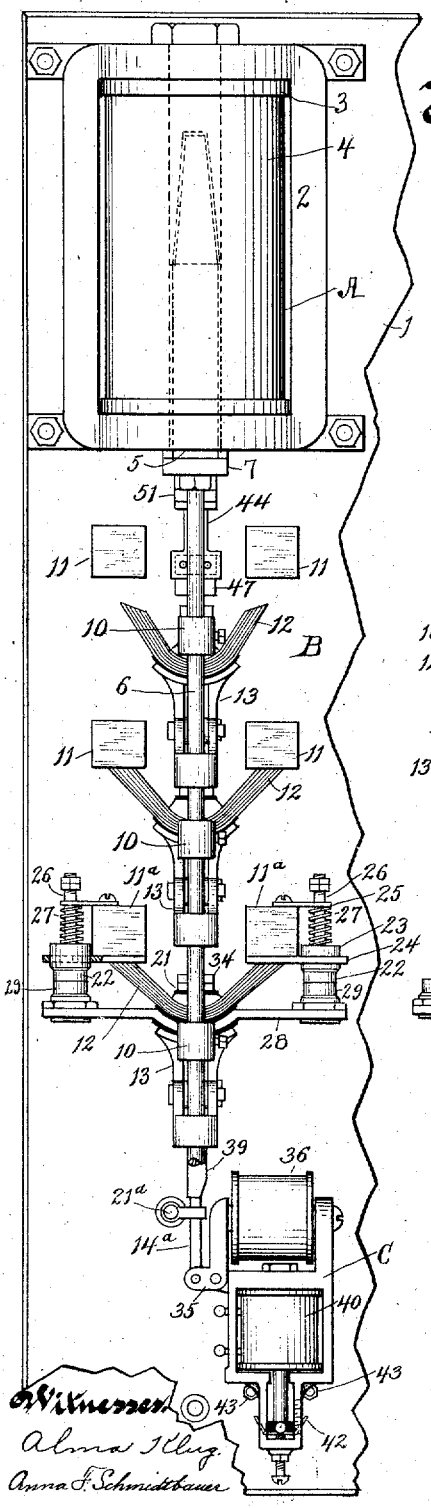
Figure 4:
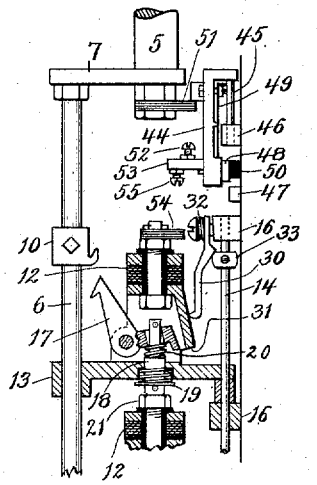
Figure 5:
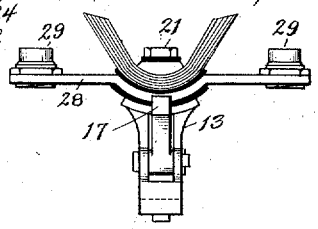
Figure 3:
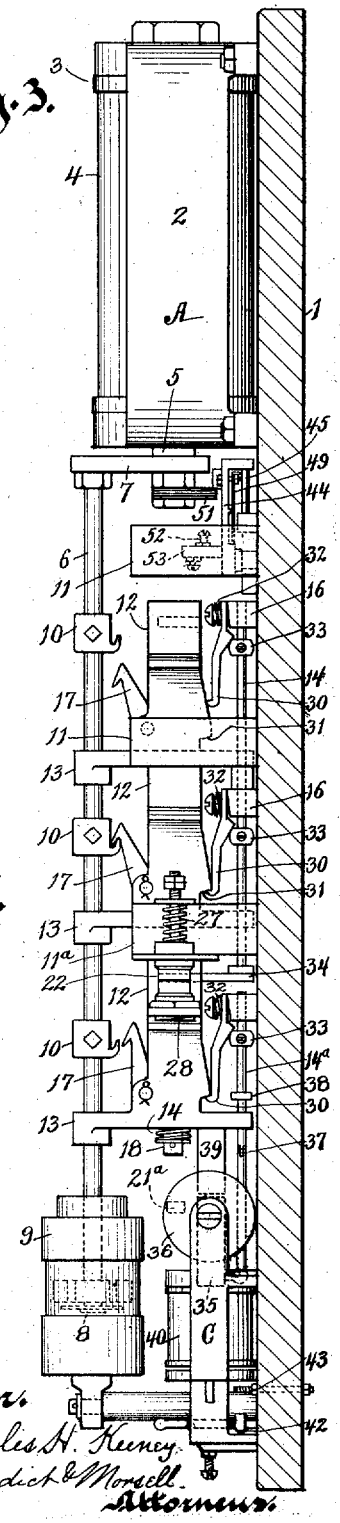

In the drawings, Figure 1 is a diagram of an electric system in which my improved devices may be employed, the devices embodying my invention being indicated thereon in suitable relations to the electric system. Fig. 2 shows a master-solenoid and devices therewith that are controlled or actuated thereby or related thereto. Fig. 3 is a side elevation of the solenoid and devices shown in Fig. 2. Fig. 4 is a detail, partly in section, of devices shown in Figs. 2 and 3. Fig. 5 is a front view of an auxiliary frame supporting a brush circuit-closer. Fig. 6 is a front view, partly in section, of a solenoid-reversing switch; and Fig. 7 is an edge view of the reversing-switch shown in Fig. 6.

My present invention is embodied in several devices or sets of devices and their connections and relations to each other in an electric-motor system, which may be such as is shown in Fig. 1, and for convenience of reference and description these devices or sets of devices may be designated as follows: a master-solenoid A, a plurality of circuit-closers B, an automatic cut-off C, a hand-switch D, and a solenoid-reversing switch E. Besides these there are other electrical and mechanical devices going to make up the complete mechanism, but which it is not important to segregate or specifically individualize.

The electric connections of the several electrical devices are shown on the diagram Fig. 1, and the several lines thereof are hereinafter described, and the operations of the devices in connection with the lines are explained.

In the drawings, 1 represents a slab of slate which is adapted to be affixed in upright position to a suitable support, and this slab or slate serves as a suitable support for the devices embodied in my invention and as an insulator therefor. Any equivalent means of support and insulation for the devices may be employed; but a slate is deemed preferable. A solenoid-frame 2 is secured detachably to the slate, and a solenoid-spool 3 and its coil 4 are mounted in the frame substantially as is common in the construction of solenoids. A soft-iron solenoid-plunger 5 is loose and is adapted to move vertically in the spool of the solenoid. A lifting-bar 6 is secured conveniently by an arm 7 to the lower end of the plunger 5 and depends vertically therefrom. The bar 6 is advisably provided with a piston-valve 8, which enters a dash-pot 9 and is adapted to act on a liquid medium in the dash-pot, whereby the too rapid descent of the lifting-bar is prevented when it is dropped by the master-solenoid being deënergized. The lifting-bar 6 is also provided with a number of catches 10, secured adjustably thereon, the number of catches corresponding with the number of devices to be engaged thereby, as hereinafter set forth.

A plurality of sets of line-terminal contact-pieces 11 11 and 11ª are mounted in sets one above the other on the slate 1 and adjacent to the lifting-bar 6. In the drawings three sets of these contact-pieces are shown; but the number may be increased to any extent required, or no more than two sets may be employed. These contact-pieces are severally terminals of lines of the electric system. A number of electric-circuit closers 12 12, preferably constructed of laminated copper and corresponding in number with the sets of contact-pieces 11 and 11ª, are so mounted as normally to be out of contact with the contact-pieces 11 11ª, but to be capable of being lifted, and thereby put severally one after another into electrical contact with their several sets of contact-pieces 11 or 11ª.

Each of the brush circuit-closers 12 is mounted on an auxiliary frame 13, which frame is slidable vertically at one side on the lifting-bar 6 and at the other side on shifting rods 14 14ª, which rods are mounted slidably endwise vertically in posts 16, fixed on the slab 1. Each of the frames 13 is provided with a hook 17, pivoted thereon and advisably in bell-crank form. A tilting rod 18, slidably endwise vertically in the frame 13, passes loosely through an aperture therefor in one arm of the bell-crank hook 17 and is held therein by a pin through the upper extremity of the rod. The hook-tilting rod 18 is held downwardly by a spring 19, and thereby the hook 17 is tilted rearwardly out of the path of the catch 10, with which the hook 17 is adapted to engage when the hook is tilted forwardly into the path thereof. A spring 20 about the rod 18 under the arm of the hook 17 is adapted to hold the hook yieldingly forward in the position shown in Fig. 4, so that the hook when the rod 18 is elevated, as shown in Fig. 4, will be in the path of the catch 10, but permitting the hook to yield rearwardly sufficiently to permit the catch to pass the hook when the bar 6 goes down and causing the hook to resume such position as to be caught by the catch and held thereto releasably, thereby lifting the frame 13 as the bar 6 is elevated. A nut 21 on each of the frames 13 below the uppermost one serves as a buffer that on the movement of any of these frames 13 upwardly will contact with and lift the rod 18 in the frame 13 above it, tilting the hook 17 into the position shown in Fig. 4.

A stop 21ª, fixed on the slate 1, acts to limit the downward movement of the lowermost rod 18, but permits a slight independent down movement of the lowermost brush circuit-frame 13, and thus throws the hook carried by said lowermost frame into position to allow said hook to be caught by the lowermost catch 10 of the lifting device, and hence provides for the movement of said lowermost frame upwardly The lowest set of contact-pieces 11ª are provided with auxiliary contact-pieces 22 22, which auxiliary contact-pieces 22 are advisably of carbon, being mounted in metal cups 23, movable vertically in guide-frames consisting of the metal arms 24 25, which are affixed to the contact-pieces 11ª. The cup 23 is provided with a standard 26, that passes loosely through the frame member 25 and is provided with stops consisting of a nut or nuts on its upper end for limiting the movement of the cup and auxiliary contact-piece downwardly. A spring 27, coiled about the standard 26 below the frame member 25, holds the cup 23 and the auxiliary contact-piece downwardly yieldingly. A metal bar 28 is mounted and insulated on the lowest frame 13, and this bar is provided with carbon contact-pieces 29 29, registering with and adapted to contact the pieces 22 22. This device forms a carbon break for the electric line of which the contact-pieces 11ª are terminals, the break being adapted to close the line in advance of the closing accomplished by the brush 12 belonging to this set of terminal pieces when this lowest frame 13 is first lifted by the master-solenoid. On the reverse down movement of the brush-carrying frame the brushes 120 separate from contacts 11ª, and all the current is carried by the carbon breaks 22 and 29 until said carbon-breaks are finally separated by the continued down movement of the brush-carrying frame. By this arrangement the arcing occurs entirely between the carbon-contacts, and hence prevents the burning between the contacts 11ª and the brush which would occur if the current were broken between the contacts 11ª and the laminated brushes. The brushes 12 are insulated on the frames 13, as well as the break-bar 28.

In connection with each of the frames 13 there is a supporting-hook 30, suspended loosely on a pin fixed in the post 16, suitably located therefor, and these hooks are adapted each to engage releasably a shoulder or catch 31 on the frame 13. These hooks are held yieldingly normally in a suspended position out of the path of the shoulder 31 by a spring 32, but are adapted to be slightly tilted into the path of the shoulder by means of a button-cam 33, secured adjustably on the rods 14 and 14ª. The rod 14 at its lower end is provided with a laterally-projecting arm 34 and the rod normally rests on the post 16 immediately below its lower end. The arm 34 projects above and in the path of the lowest frame 13 and so as to be contacted directly by the nut 21 thereon and lifted thereby as the auxiliary frame 13 goes up. By the movement upwardly of the rod 14 the cams 33 force the hooks 30 into the path of the catches 31, and as each of the frames 13 is raised its catch 31 is carried past the hook 30 and is then engaged thereby, whereby the frame 13 is held in this elevated position, holding the circuit-closer 12 in contact with the terminal pieces 11 until the frame is released from the hook 30, which release is accomplised by the slipping of the hook from beneath the catch when the hook is no longer held up to its work by the cam 33. The cams 33 are withdrawn by the descent of the rod 14, which occurs by gravity when the rod is no longer supported by the lowest frame 13. The rod 14ª, which is substantially a prolongation of the rod 14 and is provided with a cam 33, that bears against the lowest hook 30, is pivoted at its lower end to one arm of a bell-crank armature-frame 35 and is lifted and held upwardly by the action of the bell-crank frame when the armature thereon is held to its electromagnet 36 by the energizing thereof electrically. The rod 14ª is released and drops down by the tilting of the bell-crank frame 35 when the armature is released. The lower end of the rod 14ª is advisably jointed at 37 to the upper portion of the rod, and a stop 38 on the rod may be employed as an additional means for limiting the movement of the rod downwardly, the stop resting on the lowest frame 13. The coil of the electromagnet 36 is in a shunt-line of the electric system. A cam 39, projecting downwardly from the lowest frame 13, is adapted to contact wedgingly with an arm of the bell-crank frame 35 and tilt the frame to a position in which the armature thereon is substantially in the position shown in Fig. 2 when the lowest frame 13 is at the lowest limit of its travel—that is, in its position when at rest.

In connection with the electromagnet 36 a solenoid 40 may also be employed. The electromagnet is adapted by the release of its armature when the electrical energy becomes very light to let down the rod 14ª, and thereby let down the lowest frame 13, and consequently all the other frames 13, thus opening all the electric lines closed by the circuit-closers 12 and the break 28, thus putting the motor out of action when the current becomes too weak. The solenoid 40 is adapted when there is an overload of the electric current to short-circuit the electromagnet 36, and thereby permit the lower releasing-rod to drop by reason of the bell-crank armature 35 being released by the electromagnet 36, whereby the motor is put out of action the same as when there is an underload. This solenoid 40 has the usual spool and coil, with a soft-iron core or armature 41 and a circuit-closer 42, adapted to contact with the line-terminal contact-pieces 43 43 in a shunt of the line that includes the coil of the electromagnet 36. The specific forms of the electromagnet 36 and the solenoid 40 are not material to this invention; but I preferably employ devices like those shown in my Patent No. 677,360, issued to me July 2, 1901. The frame of the electromagnet 36 and the solenoid 40, as well as the contact-pieces 43, may be supported on the slate 1.

In the electric circuit that includes the coil 4 of the master-solenoid there is a circuit-closer 44, preferably in the form of a metal slide provided with a guide-rod 45, that is movable endwise in a block 46, fixed on the slate 1. This block 46 is one of the line-terminal contact-pieces, and the other terminal contact-piece 47 is also secured to the slate 1. The circuit-closer 44 is provided with a carbon point 48, which fits movably in the metal portion of the circuit-closer 44 and is forced outwardly yieldingly by a spring 49, secured to and fulcrumed on the metal portion of the circuit-closer. Normally the carbon point 48 rests on a dead-block 50 of insulating material, which is fixed on the slate 1 adjacent to the terminal contact-piece 47. The construction and disposition of the block 50 and the terminal contact-piece 47 are such that the carbon point 48 can slide from one to the other as the circuit-closer is shifted vertically. The circuit-closer is held in position movably by the frictional contact of the carbon point 48 on the block 50 and contact-piece 47. When the solenoid-plunger 5 is drawn into the solenoid, as shown in Fig. 2, and the bar 6 is thereby lifted into the position shown in Figs. 2, 3, and 4, an arm 51, of insulating material, secured to the lower end of the plunger 5, engages a projecting part of the circuit-closer 44 and lifts the circuit-closer and holds it in the position shown in Fig. 4, in which the electric circuit of the coil of the master-solenoid is broken. When the plunger 5 goes down, the arm 51 engages an adjustable member 52 on a projecting finger 53 of the circuit-closer 44 and moves the circuit-closer down until the carbon point 48 contacts with the terminal piece 47, thereby closing the electric circuit of the master-solenoid coil. When the uppermost frame 13 is lifted to its elevated position, an arm 54, of insulating material, fixed on the frame, engages an adjustable member 55 on the finger 53 and lifts the circuit-closer 44 into the position shown in Fig. 4, in which the electric circuit of the master-solenoid is open, and holds it in this position so long as the frame 13 is held in this elevated position by its hook 30.

The solenoid-reversing switch (designated E and shown in detail in Figs. 6 and 7) consists of two solenoids and mechanism and apparatus in connection therewith for closing and reversing electric lines. The metal frames 56 57 of these solenoids are mounted in insulation conveniently on the slab 1. The means for mounting these solenoid-frames or solenoid-poles, which I prefer, is shown in Figs. 6 and 7, in which projections on the frames 57 are secured directly to electric-line-terminal contact-pieces 58 58ª, 59 59ª, 60 60ª, and 61 61ª by bolts or screws. These contact-pieces are severally fixed on the slab 1, preferably by means of a threaded metal rod 62, which forms electrically a part of an electric circuit. Nuts 63 63 turn on the rod 62, one against each side of a contact-piece, and clamp it in position adjustably on the rod. Another nut 64 turns on the rod against the surface of the slate, and a corresponding nut may be employed on the other side of the slate, turning on the rod to secure the rod in position in the slate. The solenoid-coils 65 66 are wound on spools and are mounted in the frames 56 and 57, respectively, in the usual manner of solenoids. The plunger-armatures 67 68 for these coils are provided, respectively, with shifting rods 69 70, which project axially therefrom in both directions and at their lower extremities are pivoted to a vibrating lever 71, pivoted centrally on a suitable support, conveniently on the slate 1. This construction secures a reversely-synchronous movement of the plungers 67 68 in the solenoid-coils and of the circuit-closers mounted on the rods 69 and 70. Each of the line-terminal contact-pieces shown in Figs. 6 and 7 is provided with a carbon contact-piece 72, mounted in a metal cup 73, which is movable endwise in a metal arm therefor secured to and forming a part of the contact-piece. The carbon contact-piece is held to advanced position yieldingly by a spring 74. The construction is substantially like that shown and described in connection with the carbon contact-pieces 22. For each of these carbon contact-pieces 72 a complementary carbon contact-piece 75 is provided, which complementary contact-pieces are mounted in pairs on four metal break-bars 76 76$^a$ 77 77$^a$, severally mounted on the rods 69 and 70, one bar at each end of each rod. These bars are provided with enlarged apertures through which the rods 69 and 70, respectively, extend, and the bars are curved at this point, so as to be capable of a slight tiltable adjustment on the rods. The bars are secured in place on the rods by nuts 78, turning by screw-thread on the rods at the two sides of the bars. The bars are insulated on the rods. This construction forms a plurality of circuit-closers in sets of the style and character known as "breaks." For closing the electric circuits between each set of line-terminal contact-pieces shown on Fig. 6 a circuit-closer, preferably of laminated copper, is employed, and these circuit-closers 79, 79$^a$, 99, and 99$^a$ are severally mounted in pairs on the shifting rods 69 and 70, respectively, above and below sets of terminal contact-pieces. The construction and disposition of the parts are such that the circuit-closer 79 will contact with the terminal pieces 58 and 58$^a$ at the same time that the circuit-closer 99 will contact with the terminal pieces 61 and 61$^a$, and so that the circuit-closer 79$^a$ will contact with the terminal pieces 59 59$^a$ at the same time that the circuit-closer 99$^a$ contacts with the terminal pieces 60 60$^a$ and by reversal that these circuit-closers will in the same relation be separated from the terminal pieces, thus opening the circuits correspondingly.

Referring to the diagram Fig. 1, which illustrates a system of electric line-wiring in connection with the several devices combined in my invention, it will be noted that the devices and wiring there shown above and including the binding-posts K are mounted on the slate 1 and in this form are adapted to be connected up through the binding-posts K to the motor M and to the two lines of the electric circuit 80 80$^h$.

In referring to the electric lines that are shown on the diagram it is found convenient to trace them and refer to them as directly follows; but I do not wish to be understood as stating that the electric current runs in or on the wires in the directions indicated, as with a medium so subtle as electricity and so instantaneously permeating in all directions in which a suitable conductor is found it is not proper to speak of electricity as running in a certain channel or line.

Commencing for a convenient starting-point with the line 80, which runs to a binding-post K, the line continues as 80$^a$, including the coil of the solenoid 40, to a contact-piece 11$^a$. From said contact-piece 11$^a$ a line (designated 80$^c$) runs to the metal switch D, pivoted on the slate 1. From a terminal contact-piece 81, fixed on the slate 1, a line 80$^d$ runs to and forms the solenoid-coil 66 in the reversing-switch and thence is continued in the line 80$^e$ to a terminal contact-piece 61$^a$ and therefrom as the line 80$^f$ to the binding-post K$^4$, and thence by a line 80$^g$ to the main line 80$^h$. From a terminal contact-piece 82, fixed on the slate 1, a line 80$^i$ runs to and forms the solenoid-coil 65, and thence to the line 80$^e$. A line 80$^k$ connects the two terminal contact-pieces 59$^a$ and 61 and runs thence to the binding-post K$^3$ and from thence as the line 80$^l$ to one side of the armature of the motor M. A line 80$^m$ connects the two terminal contact-pieces 60 and 58$^a$ and thence runs to the binding-post K$^2$ and therefrom as line 80$^n$ to the other side of the armature of the motor M. A line 80$^o$ connects the terminal contact-pieces 60$^a$ and 61$^a$. A line 80$^p$ connects the terminal contact-pieces 58 and 59. Switch contact-pieces 83 and 84, fixed in the slate 1, are connected by a line 80$^q$, which runs therefrom to the terminal contact-piece 47, adapted to be contacted by the circuit-closer 44. A line 80$^r$ runs from the contact-piece 46 to and forms the solenoid-coil 4, and thence, as line 80$^s$, is continued to the line 80$^t$. A line 80$^t$ runs from the terminal contact-piece 59 to the several contact-pieces 11 and 11$^a$, forming one side of the several steps of contact-pieces 11 and 11$^a$ and thence to and forms the coil of the electromagnet 36, and thence to the binding-post K$'$, where it connects with the motor shunt-line 80$^u$ and leads to the line 80$^h$. Between the contact-pieces 11 and 11$^a$ resistant mediums are employed in the line 80$^t$. A line 80$^b$ runs from the line 80$^t$ at post 11$^a$, therein to the other set of terminals 11 11. From the line 80$^t$ a branch line 80$^v$ runs through a contact-piece 43 and thence to a terminal contact-piece 87, fixed in the slate 1, and from an adjacent contact-piece 88, fixed in the slate 1, a branch line 80$^w$ leads, by way of line 80$^t$, to the other contact-piece 43. A line 80$^y$ connects line 80$^q$ to the contact-piece 11$^a$, connected to line 80$^t$. A lamp 89 is advisably employed in line 80$^y$ as a resistance.

The construction and disposition of the switch D and parts relating thereto are such that the switch D when in an upright position will rest on the insulating-block 85 between the contact-pieces 81 and 82, and also on the segmental elongated insulating-block 86 between the contact-pieces 83 and 84. When the switch is swung either to right or left, it first contacts with 81 or 82 and thereafter on being swung farther away from the block 85 contacts coincidently with 83 or 84. A rearwardly-extending insulated metal member 98 of the switch D is adapted to contact coincidently with the terminal pieces 87 and 88, serving as a circuit-closer.

In the use of the controller above described, including the necessary wiring or electrical lines, which may be as shown in the diagrammatic view Fig. 1, and connected up to a motor and to a source of electrical energy, it would operate substantially as follows: Assuming the controller to be non-active or dead, with the switch-arm resting on the insulating-blocks 85 and 86 and on the blocks 87 and 88, the core of the master-solenoid being at the lowest limit of its travel, and all the electrical lines in which the contact-pieces for the brush-circuit closers are included being accordingly open, thereupon on swinging the switch, say, to the right it first contacts with terminal contact-piece 81, whereupon one solenoid-coil of the reversing-switch E is energized and its core drawn up and mechanically the core of the other solenoid-coil pulled down, closing the circuit of the motor-armature M in such manner as to cause the motor to rotate in one direction—say to the right. A further movement of the switch puts it in contact with contact-piece 83, whereupon the master-solenoid is energized and also the electromagnet 36. The core of the master-solenoid is thereby drawn up, and the lifting-bar 6 is lifted up, causing its lowest catch 10 to engage with the hook 17 of the lowest brush-frame, and thereby raising the said lowest frame. Of course the raising of the lower brush-carrying frame raises the wedge 39 out of contact with the armature of the electromagnet; but said armature is prevented from turning and thus lowering the lower releasing-rod, pivoted thereto, by reason of the fact that the said armature is now held to the electromagnet by the magnetization of said magnet. With the raising of the lower brush-carrying frame the carbon-contacts 29 and 22 are first brought into engagement, and following this the brushes 12 are brought into contact with the first set of terminal contact-pieces 11ª, closing the circuit and starting the motor through all the resistance in the controller. The lower brush-carrying frame being thus lifted, is caught and held up mechanically by the holding-hook 30 pertaining thereto, which hook engages the shoulder 31 on the said frame, as hereinbefore described. As the solenoid approaches the upper limit of its travel in the master-solenoid the projecting arm 51 of the core catches the circuit opener and closer 44 for the master-solenoid, and carrying it along opens or breaks the line of the master-solenoid coil, cutting the solenoid out of the circuit by permitting the core and the lifting-bar 6 to drop by gravity. It will be understood that the circuit opener and closer cannot be fastened rigidly to the solenoid-core, but lost play of the said solenoid-circuit opener and closer is provided, so as to permit an independent movement of the solenoid-core to thereby allow the said core to almost complete its movement up or down before making or breaking the circuit of the solenoid. When the core and the lifting-bar approach the lowest limit of their travel, the arm of the core engages the projection 53 from the solenoid-circuit opener and closer and carries said circuit opener and closer down with them, thereby bringing the contact of said circuit opener and closer into engagement with the contact-piece 47, beneath the dead block or piece 50, and thereby again closes the circuit of the master-solenoid coil. The movement of the core upwardly is then repeated, carrying upwardly therewith the second brush-circuit closer and cutting out one step of the resistance of the controller. The master-solenoid is now again deënergized by the shifting of the solenoid-circuit opener and closer, and the core of the master-solenoid and the lifting-bar again dropped, closing the circuit of the master-solenoid as before, whereupon the lifting-bar is again lifted, carrying the succeeding brush-circuit closer and cutting out another step of the resistance of the controller. In the form shown in the drawings, where only three brush-circuit closers are shown, this last movement cuts out all of the resistance of the controller. When the uppermost brush-circuit closer is carried up and closes its circuit, the solenoid-circuit opener and closer is again slid upwardly, thus opening the circuit of the master-solenoid, and as the core then drops the arm 51, carried thereby, engages and rests on the projection 53 from the solenoid opener and closer; but as the brush-frame carrying the uppermost brush-circuit closer is provided with a projecting arm 54, that receives thereon the projection 53 from the solenoid-circuit opener and closer, the said circuit opener and closer is supported against being moved down far enough to contact with the lower contact-piece to close the electric line. Also the solenoid-circuit opener and closer being thus prevented from going down supports the lifting-bar against falling. On swinging the switch D back to the block 85 the lower insulated circuit-closing member 98 of the switch will contact with the pieces 87 and 88, closing their circuit, thereby short-circuiting the electromagnet, deënergizing it and permitting the armature-frame to tilt in order to let down the lower holding-rod 14ª and permitting the hook 30 to slip from engagement with the shoulder 31 of the lowest brush-carrying frame, which thereupon drops and lets down the upper holding-rod 14, permitting the hooks 30 above to slip from engagement with the shoulders of the other brush-carrying frame and allowing said frames to drop by gravity, thus cutting out the motor. The apparatus is then in initial non-active position. By swinging the switch D to the contact-pieces 82 and 84 the same movements and operations are obtained, except the reverse movement of the motor secured by the reversing of the switch E.

In case of an electric underload of the electric current the electromagnet 36 releases its armature and the bell-crank frame 35 tilts, letting down rod 14ª and cutting out the motor electrically the same as if the switch D was swung to the block 85. In case of an electric overload the solenoid 40 draws up the core 41, closing the circuit of the contact-pieces 43 43, cutting out the electromagnet 36 and permitting its armature-frame 35 to tilt, permitting the rod 14ª to drop, resulting in cutting out the motor, as in other cases of the dropping of the rod 14ª.

What I claim as my invention is—

1. In an electric controller, a single solenoid and its reciprocable core, a plurality of circuit-closers adapted to be moved separately and successively by the repeated movements of the core into contact with their respective sets of circuit contact-pieces.

2. In an automatic electric controller system, a single solenoid and its core, a means attached to and actuated by the core for initially closing an electric circuit, and other means attached to and actuated by the core for successively cutting out resistance after the initial closing of the circuit.

3. In an electric controller system, a solenoid and its core, a means attached to and actuated by the core for initially closing an electric circuit, other means attached to and actuated by the core for successively cutting out resistance after the initial closing of the circuit, and means for automatically breaking the initial closure by a predetermined underload overload or breaking of electric current.

4. In an electric controller, a master-solenoid and its core, a plurality of circuit-closers adapted to be moved separately and successively into contact with their respective sets of circuit contact-pieces, means secured to and moved by the core of the solenoid for moving the circuit-closers to their contact-pieces, and other means for holding the circuit-closers releasably in contact with the contact-pieces.

5. In an electric controller, a master-solenoid and its core, a plurality of circuit-closers mounted movably, means attached to the solenoid-core adapted to bring the circuit-closers singly successively to closure with their several electric lines, other means adapted to hold the circuit-closers releasably in closure with their lines, and means for automatically releasing the circuit-closers and permitting them to break their closures with their lines.

6. In an electric controller, a master-solenoid and its core, a plurality of circuit-closers, means carried by the core adapted to close up the circuit-closers, means to hold the circuit-closers in closure releasably, an electromagnet adapted when energized to lock said last-enumerated means and when deenergized to release said means and permit the circuit-closers to break their closures.

7. In combination, in an electric controller system, a master-solenoid and its core adapted to close up circuit-closers, an electromagnet adapted to release the circuit-closers, and a solenoid-reversing switch for reversing the electric current.

8. In combination in an electric controller system, a master-solenoid and its core adapted to close up circuit-closers, an electromagnet adapted to release the circuit-closers automatically on underload of electric current, and a solenoid and its core adapted on overload of electric current to short-circuit said electromagnet causing it to release said circuit-closers.

9. In combination in an electric controller, a movable frame having a circuit-closer mounted thereon, a bell-crank hook mounted on the frame, a spring-withheld actuating-rod adapted to be thrust against and to tilt the hook, and a yielding supporting-hook adapted to be put into engagement with and hold said frame releasably.

10. In combination in an electric controller, a movable frame having a circuit-closer mounted thereon, a bell-crank hook mounted on the frame, a spring-withheld actuating-rod adapted to be thrust against and to tilt the hook, a yielding supporting-hook adapted to be put into engagement with and hold said frame releasably, and means for moving up and locking said supporting-hook releasably.

11. In an electric controller, a plurality of circuit-closers adapted to be lifted successively into closure with their lines, a vertically-reciprocable bar provided with means for severally and successively engaging and lifting said circuit-closers, and a dash-pot into which a piston on the bar plunges adapted to retard the motion of the bar downwardly and thereby to increase the time between the movements of the bar upwardly.

12. In an electric controller, a master-solenoid and its core, a bar attached to and adapted to be lifted by the energizing of the solenoid, a plurality of circuit-closers one above the other adapted to be severally successively lifted by the bar into closure with their several lines, the lowermost closer being arranged to be lifted first, and means adapted to hold said lowermost closer in closure when it has been lifted to closure.

13. In an electric controller, a master-solenoid and its core, a bar attached to and adapted to be lifted by the energizing of the solenoid, a plurality of circuit-closers one above the other adapted to be severally successively lifted by the bar into closure with their several lines, the lowermost closer being arranged to be lifted first, means adapted to hold said lowermost closer in closure when it has been lifted to closure, and independent means adapted to hold each closer above the lowermost one in closure when each closer has been lifted thereto.

14. In an electric controller, a master-solenoid and its core, a bar attached to and adapted to be lifted by the energizing of the solenoid, a plurality of circuit-closers one above the other adapted to be severally successively lifted by the bar into closure with their several lines the lowermost closer being arranged to be lifted first, means adapted to hold said lowermost closer in closure when it has been lifted to closure, and independent means adapted to hold each closer above the lowermost closer in closure when severally lifted thereto, said last-enumerated means being arranged to be put into position to support the circuit-closers above the lowermost one by the elevating of the lowermost circuit-closer.

15. In an electric controller, a master-solenoid and its core, a bar attached to and adapted to be lifted by the energizing of the solenoid, a plurality of circuit-closers one above the other adapted to be severally successively lifted by the bar into closure with their several lines the lowermost closer being arranged to be lifted first, means adapted to hold said lowermost closer in closure, and an electromagnet adapted by an underload of current thereon to release means for holding the lowermost closer in closure and permit that closer to drop breaking the circuit.

16. In an electric controller system, a master-solenoid and its core, a plurality of circuit-closers disposed and adapted by the reciprocation of said core caused by the energizing and deënergizing of the solenoid to successively cut out resistance in a main electric circuit, a circuit-closer actuated by the reciprocation of said core to automatically cut out and to cut in the solenoid-line, and means on the last moved of the successively-movable resistance cut-out circuit-closers adapted to block said solenoid-line circuit-closer and prevent it from moving to place to cut in the solenoid-line.

17. In a solenoid-reversing switch, a pair of solenoids and their cores, means connecting said cores mechanically so that when one is drawn into its solenoid by electric energy the other will be withdrawn from its solenoid mechanically, and circuit-closers at both end of both solenoids pools connected to the cores and adapted to be closed reversely in sets by the energizing electrically of one or the other of the solenoids.

18. In a solenoid-reversing switch, a solenoid and its core, a circuit-closer mounted on the outer end of said core, a non-magnetic extension of the inner end of said core, and a circuit-closer mounted on the non-magnetic extension of the core.

19. In combination, a single solenoid and its core arranged to reciprocate, and means actuated by the core whereby the initial movement of the core will close a circuit and each suceeding duplicate movement in one direction will close a circuit and cut out a unit of resistance.

20. In an electric controller system, a single solenoid and its therein-reciprocating core, and a series of devices moved by the core for successively cutting out a new unit of resistance mechanically each time the solenoid is energized.

21. In an electric controller system, a solenoid and its core, means for successively cutting out a unit of resistance mechanically each time the solenoid is energized, and other means for breaking the initial circuit and setting in all of the units of resistance at a predetermined overload or underload of the electric current.

In testimony whereof I affix my signature in presence of two witnesses.

CHARLES H. KEENEY.

Witnesses:
A. L. MORSELL,
ALMA KLUG.